United States Patent [19]
McConnell, III

[11] 4,411,779
[45] Oct. 25, 1983

[54] FLUID TREATMENT SYSTEM

[76] Inventor: Frank G. McConnell, III, 1440 Dineen Ave., Orlando, Fla.

[21] Appl. No.: 899,553

[22] Filed: Apr. 24, 1978

[51] Int. Cl.³ ............................................. B01D 23/24
[52] U.S. Cl. .................................... 210/108; 210/142; 210/275; 210/283
[58] Field of Search ............................... 210/106–108, 210/142, 266, 283, 284, 275

[56] References Cited

U.S. PATENT DOCUMENTS

| | | | |
|---|---|---|---|
| 690,333 | 12/1901 | Wanner | 210/283 |
| 3,512,644 | 5/1970 | Nash | 210/108 |
| 3,616,915 | 11/1971 | Whitlock | 210/108 |
| 4,001,113 | 1/1977 | Schoenrock et al. | 210/275 |
| 4,032,443 | 6/1977 | Ross | 210/108 X |
| 4,051,032 | 9/1977 | Borchardt | 210/142 |

*Primary Examiner*—Ivars C. Cintins
*Attorney, Agent, or Firm*—Duckworth, Allen, Dyer & Pettis

[57] ABSTRACT

A fluid treatment system includes a tank divided into a horizontal series of filtering sub-chambers by perforated plates. A series of graded filtration media, beginning with a coarse medium and progressing to a fine medium such as sand is disposed in consecutive sub-chambers. Various features are provided with this system to perform desirable system operations. For example, the system is provided with input and outlet pressure sensors, and means for detecting the pressure differential between those two sensors, to indicate the desirability of backwashing the filtration media contained within one or more sub-chambers. The system is further provided with plural pumps and valves to permit backwashing of the fine filtration medium in a direction reverse to the direction of filter flow, and transverse to that direction.

28 Claims, 5 Drawing Figures

| LOGIC TABLE | | | |
|---|---|---|---|
| | (a) | (b) | (c) |
| $P_1$ | ON | OFF | OFF |
| $P_2$ | OFF | ON | ON |
| $P_3$ | OFF | ON | ON |
| $V_1$ | OPEN | (TIME DELAY) CLOSED | CLOSED |
| $V_2$ | CLOSED | OPEN | (TIME DELAY) CLOSED |
| $V_3$ | (TIME DELAY) CLOSED | CLOSED | OPEN |
| $V_4$ | CLOSED | CLOSED | OPEN |

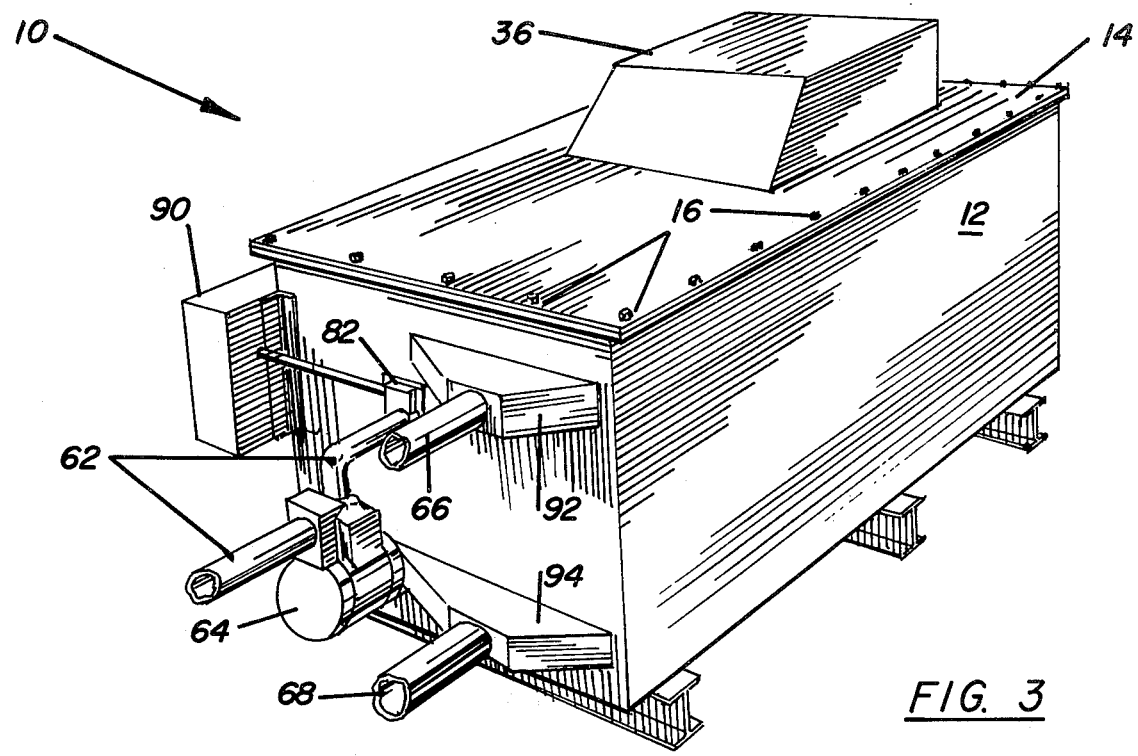
FIG. 3
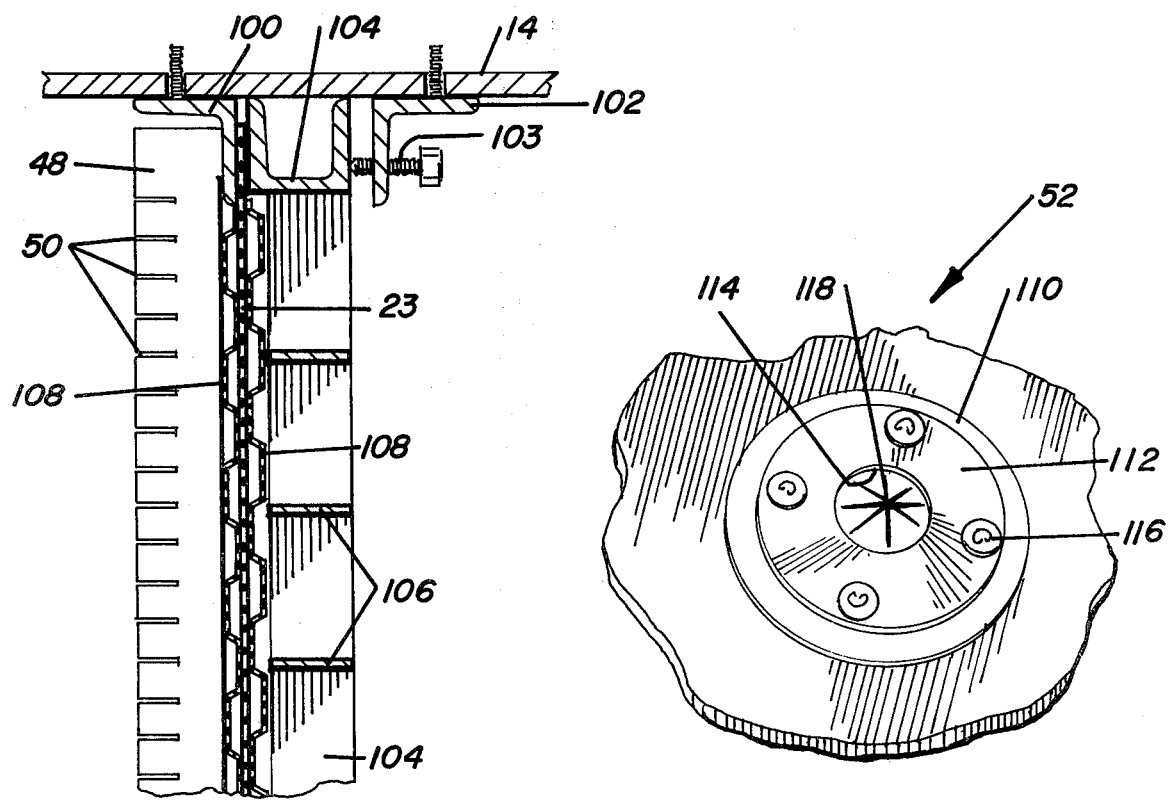
FIG. 4
FIG. 5

FLUID TREATMENT SYSTEM

BACKGROUND OF THE INVENTION

1. Field of the Invention

The present invention relates to fluid treatment systems, and particularly to systems which are specifically designed to treat waste water.

2. Description of the Prior Art

Conventional filtration systems for treating waste water typically include a vertical filtering arrangement employing either sand or gravel or both as the filtration media. Such systems have been provided with backwashing means to vertically expand the media upwardly, but following such backwashing treatment the media settle back into place and in a stratified or graded arrangement on account of gravity.

SUMMARY OF THE INVENTION

The present invention contemplates a fluid treatment system comprising an enclosed housing having an inlet at one end and an outlet at another end, with a filtration medium disposed in the housing for removing undesirable constituents in the fluid during passage between the inlet and the outlet. Means are provided for pumping a fluid to be treated into the inlet and between the inlet and the outlet, and backwashing means are provided for introducing a cleansing fluid into the filtration medium. First means coupled to the inlet is disposed in the housing for measuring fluid pressure adjacent the inlet, and in a flow path a second pressure measuring means is disposed adjacent the outlet, the system being further provided with means for detecting the pressure differential between the first and second pressure differential measuring means and providing an output when the pressure differential exceeds a preselected level. Means are also included for energizing the backwashing means responsive to the output from the pressure differential means.

The preferred embodiment of the present invention also includes several other unique features which are designed to provide a more efficient filtering of the fluid under treatment. One such feature is the inclusion of an expansion chamber above the filtration media, such that the filtration medium may be expanded upward during the backwashing cycle. In this preferred embodiment, a weir is provided in the expansion chamber for removing the cleansing fluid during the backwashing operation. Such an arrangement was first publicly disclosed in U.S. Pat. No. 4,051,032 Bochardt.

Another feature incorporated in the design of the preferred embodiment of the present invention is a plenum disposed along the bottom of the housing, with a plurality of one way valves extending through the plenum wall and permitting the flow of cleansing fluid only from the plenum and into the first chamber. The plenum is, in turn, coupled to the backwashing means. Suitably, the one way valve comprises a flexible membrane having a plurality of radial slots therein.

Another form of the present invention utilizes a second, more coarse filtration medium than the first filtration medium positioned upstream in the flow path from the first filtration medium. A hollow riser extends from the plenum vertically into this coarse medium, and permits the cleansing backwashing fluid to flow from the plenum, through the riser and through the coarse medium. This arrangement was also first published in U.S. Pat. No. 4,051,032 Bochardt.

Another feature of the present invention contemplates the utilization of valves and controls therefor which insures the complete opening of one valve, before the closing of a previously open valve, to prevent damage from excess pressures within the housing.

Other unique features incorporated in the design of the present invention will be better understood with reference to the detailed description and the drawings, which are described next.

THE DRAWING

FIG. 3 is a perspective view illustrating the apparatus of FIG. 1.

Figures 1, 2:
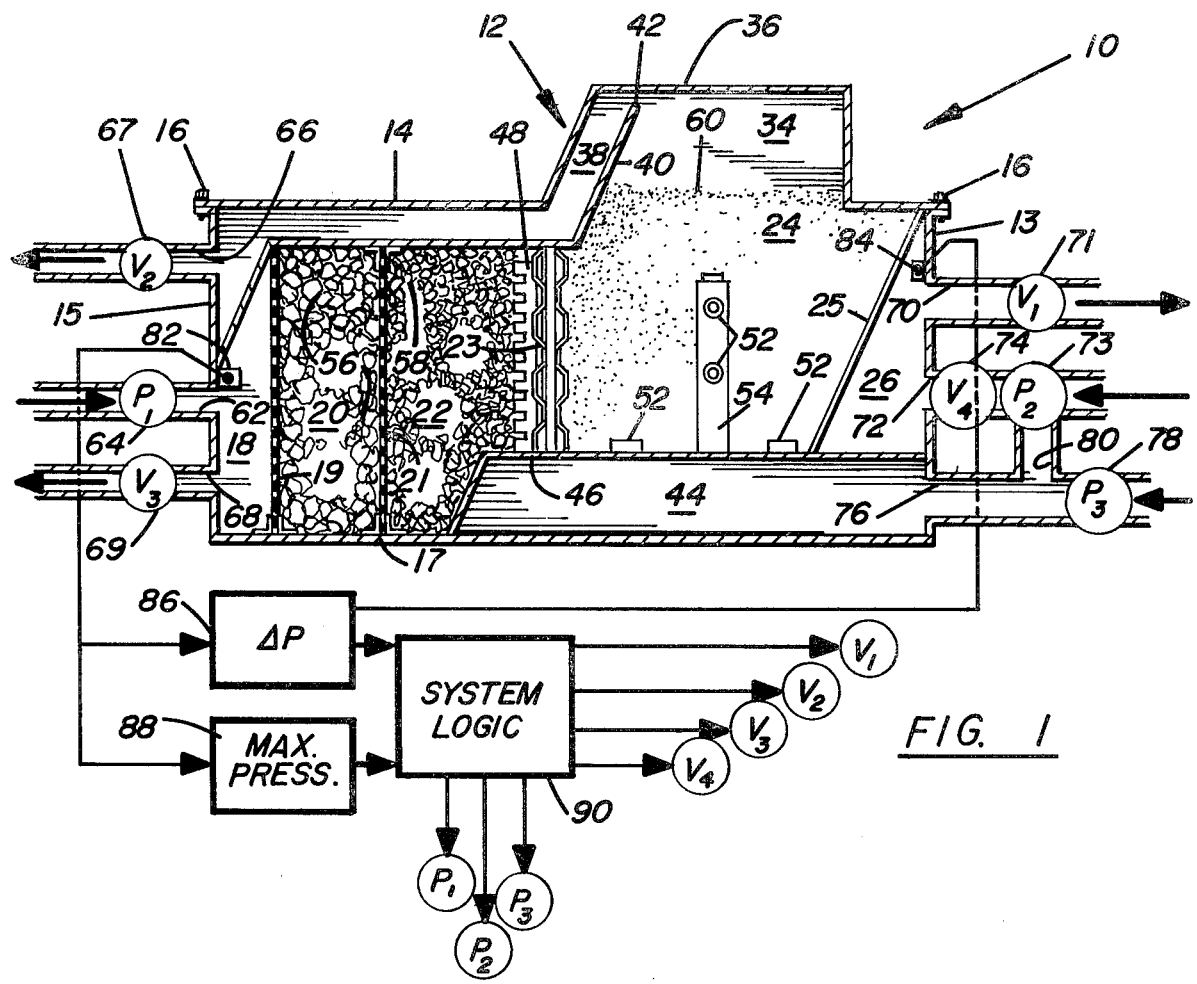
FIG. 1 is a cross-sectional side view illustrating apparatus embodying the system of the present invention, and further schematically illustrating other components of the system.
FIG. 2 is a logic table illustrating the functions of a portion of the apparatus of FIG. 1.

FIGS. 4 and 5 likewise illustrate features of the apparatus shown in FIG. 1.

DETAILED DESCRIPTION

A preferred embodiment of the present invention will be described with reference to FIGS. 1 through 5 of the drawings.

Referring first to FIG. 1, the system, referred to generally with reference numeral 10, includes a housing 12 defined by opposing side walls, 13, 15, a floor 17 and a removable top 14 which is fastened to the opposing side walls 13, 15 by fasteners 16. Preferably, the housing is constructed of steel or any other suitable metal capable of withstanding relatively high pressures.

With continued reference to FIG. 1, the housing 12 is divided into plural chambers 18, 20, 22, 24 and 26 by spaced perforated partitions 19, 21, 23 and 25 in the manner shown in FIG. 1. Perforations in the partitions 19, 21, 23 and 25 are progressively smaller beginning with the first partition 19 and ending with the fourth partition 25. By way of example, the diameter of the perforations in the partitions may be in the order of ⅜" for the first partition 19 and progressively smaller to a diameter of about 0.008 inches for the last partition 25. Partitions 19 and 21 are suitably fabricated from aluminum and are of a sufficient thickness, on the order of 0.090 inches, to establish a relatively high degree of tensile strength. Partitions 23 and 25 are suitably fabricated from a stainless steel mesh screen.

The frames of partitions 19 and 25 are conventionally welded in place. Preferably, the frame for partition 25 is welded below the joint between wall 13 and the top 14. The partitions 23 and 25 defining the chamber 24 are held in place in a manner which is described in greater detail below with reference to FIG. 4.

With continued reference to FIG. 1, the chamber 24 includes an integral expansion chamber 34 defined by an enlarged cap 36 at the top 14. Disposed within the chamber 34 is a weir 38 defined by a wall 40 extending from the end wall 15 of the housing 12 into the expansion chamber 34, and thence upward to form a restricted oriface 42 at the top of the expansion chamber.

The housing 12 further includes a plenum 44 defined by a wall 46 spaced from the bottom of the housing 12 underneath the chambers 24 and 26 and a portion of the chamber 22. The plenum 44 communicates with the chamber 22 via a vertical riser 48 having plural horizontal slots 50 therein. This riser 48 is shown in greater detail in FIG. 4. In a similar manner, the plenum 44 communicates with the chamber 24 via plural one way valves 52, the specific form of which is described in greater detail below with reference to FIG. 5. Some of these one way valves are mounted on vertical risers 54 extending into the chamber 24. In accordance with the present invention, a filtration medium is disposed in each of the chambers 20, 22 and 24. Preferably, the filtration media is graded from a coarse grade to a fine grade in the direction of flow between the front wall 15 and the back wall 13 of the housing 12.

The housing 12 further includes a plurality of inlets and outlets and associated pump and valves as follows.

Extending through the wall 15 is an inlet 62 with a first pump 64 positioned therein for injecting a fluid to be treated into the housing 12 in a direction of flow between the front wall 15 and the back wall 13. The front wall 15 further includes first and second backwashing outlets 66, 68 with respect to first and second backwash valves 67, 69 coupled therein. In the drawing, the first backwashing valve is identified by the designation V2, and the second backwash valve as V3. The first backwash outlet 66 communicates only with the restricted opening 42 through the weir 38, by virtue of the wall 40 abutting the side wall 15. The second backwash outlet 68 communicates with the first chamber 18.

Referring now to the right hand side of FIG. 1, the wall 13 includes an outlet 70 with a valve 71 (identified as V1 in the drawing) positioned therein. This outlet receives the fluid being treated after passage through the various chambers 18, 20, 22, 24 and 26, and the associated filtration media. The system 10 further includes two backwashing fluid inlets 72, 76. The first of these backwash fluid inlet 72 has a pump 73 and a valve 74 positioned therein, serially in the direction of flow into the chamber 26. The second backwash inlet 76 includes a pump 78 therein. A connector pipe 80 is coupled between the pump 73 and the inlet 76 between the wall 13 and the pump 78. As shown in FIG. 1, the pump 78 communicates with the plenum 44 through the backwall 13. As is also shown in FIG. 1, the pumps 73, 78 are referred to by the designation P2 and P3, and the valve 74 is referred to as V4.

Reference is now made to the schematic portion of the FIG. 1.

The system 10 is provided with first and second pressure sensors 82, 84. The first pressure sensor 82 is connected within the chamber 18 adjacent the inlet 62. The second pressure sensor 84 is located within the housing 12 in the last chamber 26 adjacent the outlet 70. Each of the pressure sensors 82, 84 may comprise a commercially available sensor capable of providing an electrical output representative of the instantaneous pressure. As shown in FIG. 1, each of the pressure sensors 82, 84 are coupled to a pressure differential measuring unit 86 outside of the housing 12. By way of example, the sensors 82, 84 and the unit 86 may comprise a system manufactured by United Electric Control Company of Watertown, Mass., and identified as Model No. J21K/J27KD. Pressure differential control systems of this type are adjustable so as to provide an electrical signal output representative of a pre-selected difference in pressure between the sensors 82, 84. Similarly, the system 10 is provided with a maximum pressure detection and cutout switch 88. By way of example, a switch of this type is manufactured by United Electric as specification J6. The system 10 is further provided with a system logic subsystem 90, which may conventionally comprise an electronic system for controlling the operation of the pumps P1, P2 and P3, as well as the valves V1-V4. The specific form of this system logic is well known in the prior art, and is therefore not described in great detail here. The functions of the system logic system 90 are shown in a logic table set forth in FIG. 2, wherein the sequence of operation of the openings and closings of the valves V1-V4 and energization and de-energization of the pumps P1-P3 is depicted. The function of the system 90 will be described in greater detail below with reference to the operation of the system 10.

The system further comprises means for permitting each valve V1-V4 to be fully open before the closing of a preceding valve. This may be accomplished by employing solenoid-actuated valves, and electronics in the system 90 to insure the desired open-before-close sequence. Preferably, however, the control system 90 is pneumatic, and the valves V1-V4 comprise conventional fast open, slow close valves.

Reference is now made to FIGS. 3, 4 and 5, where further features of the present invention will be described in greater detail.

With specific reference to FIG. 3, an outside view of the housing 12 is shown in perspective, in which like numerals refer to the same elements as those shown in FIG. 1.

The housing 12 further includes a pair of transitions 92, 94 which are disposed in a respective backwash outlets 66, 68. These transitions form a relatively wide opening in the wall 15 and taper to the opening in the pipe forming the respective outlet 66, 68. As will be described below, the fluid being treated within the housing 12 may comprise an effluent having a high percentage of suspended solids therein. Since these suspended solids may be trapped in the coarse filtration medium 56 within the chamber 20, the backwashing of that medium will result in the solids being forced back through the backwash outlet 68. Therefore, the transition 94 is designed to permit these solids to be funneled into the outlet 68 without clogging that outlet. Similarly, the backwash outlet 66 is provided with the transition 92.

Reference is now made to FIG. 4, which illustrates the bracket arrangement for holding the perforated partitions 23 and 25 of FIG. 1. The arrangement shown in FIG. 4 includes a pair of L-shaped brackets 100, 102, each of which includes a threaded shaft extending through the top 14 of the housing 12. The perforated partition 21 is abutted against one side of the bracket 100 with a U-shaped channel bracket, which extends about the periphery of the housing 12, abutting the perforated partition 23. The bracket 104 includes a plurality of ribs 106 that extend across the chamber 24 (note FIG. 1) and support the perforated partition. The second bracket 102 includes a threaded shaft 103 therein, which permits biasing of the bracket 104 against the outer periphery of the perforated partition 23.

Preferably, an expanded metal sheet 108 is positioned on opposite sides of the perforated partition 23.

Reference is now made to FIG. 5, which illustrates the one-way valve 52 of FIG. 1. Each valve 52 is formed of a rubber gasket 110 which abuts the wall 46 of the plenum 44. A washer 112 having a central opening 114 therein is provided, and is braided with brads 116 to the wall 46. The flexible member 110 includes a plurality of radial slots 118 therein positioned in the opening 114 of the washer 112, so as to form a one-way "flapper valve" arrangement. A similar structure is used with the one-way valves 52 connected to the vertical riser 54 (Note FIG. 1).

Operation of the system 10 will now be described with reference to FIGS. 1 and 2.

Initially, a fluid to be treated is injected into the inlet 62 by operation of the pump P1. As noted in FIG. 2, with P1 on, the other two pumps are in a de-energized position and the outlet valve V1 is open. The remaining valves V2–V4 are in a closed condition.

The fluid being treated passes through the chambers 18, 20, 22, 24 and 26 and is filtered in the desired manner by the associated filtration media 56, 58 and 60.

When the pressure differential measuring unit 86 detects a pressure difference as measured by the sensors 82, 84 and as determined by a pre-selected setting within the unit 86, that unit energizes the system logic to begin a two-step backwashing sequence, which is described next. These two steps are referred to as Sections (b) and (c) of the logic table shown in FIG. 2.

At initiation of the backwashing sequence pump P1 is de-energized and the valve V1 is closed after a time delay. Valve V2 is opened before the end of the time delay and pumps P2 and P3 are energized. Valves V3 and V4 remain in a closed condition. In this configuration, a backwashing fluid is passed through the backwashing inlet 76 via the pumps P2 and P3. It will be understood that the backwashing fluid from pump P2 passes through the pipe 80 into the inlet 76 and thus is in parallel with the backwashing fluid being pumped by the pump P3. The backwashing fluid entering the inlet 76 passes through the plenum 44 and into the vertical riser 54 and thus out of the associated one-way valves 52, as well as the one-way valves 52 extending through the wall 46. Generally the backwashing fluid from the plenum 44 may be forced up the riser 48 in the chamber 22; however, by virtue of the closed condition of the valve V3, there is no flow of the backwashing fluid through the chamber 22 in the direction toward the front wall 15. Thus, the only flow of the backwash fluid is upward in the chamber 24 into the expansion chamber 34, through the restricted oriface 42 in the weir 38, and then out of the housing 12 via the valve V2. As the backwashing fluid moves in this vertical direction, the filtration media 60 is expanded upward.

After a period of time, on the order of 4 minutes, the system logic closes valve V2, after a time delay, and opens valves V3 and V4 as is shown in column (c) of the logic table of FIG. 2.

During this phase of the backwashing sequence, backwashing fluid passes both through the inlets 72 and 76 into the respective chamber 26 and the plenum 44. Thus, the backwashing fluid flows through the filtration media 60 and the chamber 24 in a horizontal direction which is reverse to the direction of effluent flow between the inlet 62 and outlet 70, as well as in a horizontal direction within the chambers 18, 20 and 22 by virtue of both the flow back through the chamber 24, as well as the flow out of the vertical riser 48 via the plenum 44. In this way, the suspended solids contained in the coarse filtration media 56 and 58 within the chambers 20 and 22 is flushed backwards into the backwash outlet 68 and through the valve V3. It will be understood that during this second phase of the backwashing sequence, the outlet valve V1 remains in a closed position.

After the second of phase of the backwashing sequence is completed, which may last on the order of 3 minutes, valves V2, V3 and V4 are closed after a time delay, while valve V1 is opened. Pumps P2 and P3 are de-energized and pump P1 is turned on to again inject the effluent being treated into the housing 12.

I claim:

1. A fluid treatment system, comprising:
an enclosed housing having an inlet at one end and an outlet at another end;
a filtration medium disposed in said housing for removing undesirable constituents in said fluid during passage between said inlet and said outlet;
means coupled to said inlet for pumping said fluid to be treated into said inlet and in a flow path between said inlet and said outlet;
backwashing means for introducing a cleansing fluid into said filtration medium;
first means disposed in said housing for measuring fluid pressure adjacent said inlet;
second means disposed in said housing for measuring fluid pressure adjacent said outlet;
means for detecting the pressure differential between said first and second pressure measuring means and providing an output when the pressure differential exceeds the selected level;
means for energizing said backwashing means responsive to said output from said pressure differential means;
a plurality of perforated partitions in said housing spaced between said inlet and said outlet and separating said housing into plural chambers, with said medium disposed in the first one of said chambers;
an expansion chamber above said first chamber;
means coupling said backwashing means with said housing and in communication with said first chamber, whereby said cleansing fluid expands said filtration medium upward in said first chamber and into a portion of said expansion chamber; and
a weir in said expansion chamber for removing said cleansing fluid therefrom.

2. The system recited in claim 1 further comprising:
drain means coupled with said weir for draining said cleansing fluid from said weir;
a weir drain valve coupled with said drain means, whereby opening of said valve permits the flow of the cleansing fluid out of the weir and through said drain means and said weir drain valve; and
means for opening said weir drain valve during at least a portion of the period of energization of said backwashing means.

3. The system recited in claim 1 wherein said means coupling said backwashing means with said housing comprises:
a plenum defined by a wall spaced from the bottom of said housing, said plenum extending along said first chamber; and
plural one-way valves in said plenum wall permitting the flow of said cleansing fluid from said plenum into said first chamber.

4. The system recited in claim 3 wherein each said one-way valve comprises a flexible membrane having plural radial slits therein.

5. The apparatus recited in claim 3 further comprising:
at least one hollow, vertical riser extending from said plenum wall and into said first chamber; and
plural one-way valves along said vertical riser.

6. The system recited in claim 3 wherein said partitions further define a second chamber adjacent said first chamber and wherein said plenum extends across one of said partitions into said second chamber.

7. The system recited in claim 6 further comprising a hollow riser extending from said plenum vertically into said second chamber, said riser having plural openings therein permitting said cleansing fluid to flow from said plenum, through said riser and into said second chamber.

8. The system recited in claim 1 further comprising safety cut off switching means coupled between said first pressure measuring means and said fluid pumping means for de-energizing said pumping means at a predetermined pressure level as measured by said first pressure measuring means.

9. The system recited in claim 8 wherein said cut off switching means is coupled parallel with said pressure differential detecting means.

10. The system recited in claim 1 further comprising:
a backwash drain extending through one end of said housing;
a backwash valve coupled at said backwash drain for permitting flow of said cleansing fluid from said housing after passage through said filtration medium; and
a transition along said backwash drain between said backwash valve and said housing for preventing blockage of said backwash drain by solids contained in said cleansing fluid.

11. The system recited in claim 10 wherein said transition comprises said housing having a relatively large aperture therein, said backwash drain tapering to a relatively small aperture at the input to said backwash valve.

12. A fluid treatment system comprising:
an enclosed housing having an inlet at one end and an outlet at another end;
means for pumping a fluid to be treated through said housing in a flow path between said inlet and said outlet;
a perforated partition across said housing between said inlet and said outlet and defining first and second adjacent chambers;
a first filtration medium in said first chamber;
a second filtration medium in said second chamber;
one of said filtration media being substantially coarser than the other;
backwashing means for introducing a cleansing fluid into said first and second chambers to permit cleansing of said first and second filtration media;
brace means supporting said partition along the outer periphery thereof;
perforated expanded metal across one face of said perforated partition, whereby said brace means and said expanded metal provides structural support to said partition and prevents movement of said filtration media across said partition; and wherein
said back-washing means includes sequential operating means for permitting sequential flow of said cleansing fluid through said first chamber during one time interval and flow of said cleansing fluid through said second chamber during another time interval.

13. The system recited in claim 12 further comprising:
a plenum defined by a wall spaced from and parallel with the bottom of said housing;
means for coupling said backwashing means with said plenum; and
means coupled with said backwashing means for permitting said cleansing fluid to flow from said plenum and into one of said chambers.

14. A fluid treatment system comprising:
an enclosed housing having an inlet at one end and an outlet at another end;
a filtration medium disposed in said housing for removing undesirable constituents in said fluid during passage between said inlet and said outlet;
first pumping means for pumping a fluid to be treated into said inlet and through said filtration medium in a first direction between said inlet and said outlet;
second pumping means including a second pump exterior of said housing for pumping a backwashing fluid through said filtration medium in a second direction which is substantially transverse to said first direction;
third pumping means including a third pump exterior of said housing for pumping a backwashing fluid through said filtration medium in a third direction which is substantially vertical and transverse to said first and second directions;
means coupling an output of said second and third pumps together in parallel; and
means for interdicting the flow of said backwashing fluid from said second pumping means in said second direction, in order to permit said second pump to aid said third pump in the pumping of said backwashing fluid in said third direction.

15. The system recited in claim 14 wherein said flow interdicting means comprises a valve.

16. The system recited in claim 14 further comprising:
a plurality of perforated partitions in said housing spaced between said inlet and said outlet and separating said housing into plural chambers, with said medium disposed in a first one of said chambers;
an expansion chamber above said first chamber;
means coupling said backwashing means with said housing and in communication with said first chamber, whereby said backwashing fluid expands said filtration medium upward in said first chamber and into a portion of said expansion chamber; and
a weir in said expansion chamber for removing said backwashing fluid therefrom.

17. The system recited in claim 16 further comprising:
means coupled with said weir for draining said backwashing fluid from said weir;
a drain valve coupled with said drain means, whereby opening of said valve permits flow of said backwashing fluid out of said weir through said drain means and said drain valve; and
means for opening said drain valve during said interdiction of flow of said backwashing fluid in said second direction, and during operation of said second and third pumps.

18. The system recited in claim 17 further comprising:
means for de-energizing first pumping means during energization of said second and third pumping means;
means for de-energizing said second and third pumping means during energization of said first pumping means;
an output valve in said outlet; and
means for closing said output valve during energization of said first pumping means.

19. The system recited in claim 18 further comprising:
a backwash drain adjacent said inlet;
a backwash valve in said backwash drain; and means for opening said backwash valve only during periods when said flow of said backwash fluid from said second pumping means is not interdicted.

20. The system recited in claim 19 further comprising:
a first transition coupling said weir drain valve with said housing; and
a second transition coupled between said backwash drain valve and said housing.

21. The system recited in claim 16 further comprising:
a plenum defined by a wall spaced from the bottom of said housing, said plenum extending along said first chamber;
means permitting flow of said backwashing fluid out of said plenum and into said first chamber; and wherein
the parallel output of said second and third pumping means is coupled to said plenum.

22. The system recited in calim 21 wherein one of said perforated partitions defining said first chamber is spaced from said outlet so as to define another chamber between said first chamber and said outlet, and wherein said pumping means is coupled through said flow interdicting means into said another chamber.

23. A fluid treatment system, comprising:
an enclosed housing having an inlet at one end and an outlet at another end;
a filtration medium disposed in said housing for removing undesirable constituents in said fluid during passage between said inlet and said outlet;
means including a first pump for pumping said fluid to be treated into said inlet and through said housing and said filtration medium in a first direction between said inlet and said outlet;
means for pumping a backwashing fluid into said housing; and
means including first and second valves for controlling the flow of said backwashing fluid so as to flow in a second direction reverse to said first direction and thereafter flow in a vertical direction transverse to said first and second directions, said controlling means further including means for sequentially opening and closing said first and second valves.

24. A fluid treatment system as recited in claim 23, further comprising a first backwash outlet above said chamber, said second valve communicating with said first backwash outlet.

25. A fluid treatment system as recited in claim 24, further comprising a second backwash outlet adjacent said inlet, said first valve communicating with said second backwash outlet.

26. A fluid treatment system as recited in claim 23, further comprising means for opening one of said first and second valves before closing the other of said valves.

27. A waste effluent treatment system comprising:
means defining a closed chamber having an inlet at one end and an outlet at another, laterally opposite end;
a plurality of perforate septa substantially vertically disposed in space relation within said chamber between the inlet and the outlet to divide same into sub-chambers through which an effluent flow path extends;
a particulate filtering medium in at least one of said sub-chambers;
backwash means for directing a backwash flow reversely to said effluent flow through at least one of said sub-chambers, said backwash means further including a first backwash inlet at the outlet end of said chamber and a first backwash outlet at said inlet end of said chamber, and first valve means for connecting the first backwash inlet to a source of backwashing water, and second valve means for selectively controlling flow condition through said backwash outlet, said first backwash inlet and outlet being effecctive to produce a flow of backwash water which is counter to the flow of effluent thereby to cleanse said septa and media of accumulated waste material;
additional backwashing means for backwashing said media at right angles to said flow path, said additional backwashing means further including a second backwash inlet adjacent the bottom of said one sub-chamber, and third valve means for selectively causing backwash water to enter said second inlet and to flow vertically therethrough to cleanse said filtering medium in said sub-chamber, said additional backwashing means further including a second backwash outlet adjacent the top of said one sub-chamber, and fourth valve means in said second outlet to control flow therethrough; and wherein
said chamber is constructed such that the vertical height of said one sub-chamber containing said medium is substantially greater than the height of said medium in said sub-chamber, thereby to allow vertical expansion of said medium during vertical backwashing.

28. A waste effluent treatment system comprising:
a closed tank having an effluent inlet at one end and an effluent outlet at an opposite end to provide an effluent flow path substantially horizontally through said tank;
a plurality of septa disposed in spaced relation within said tank to subdivide said tank into sub-chambers serially along the effluent flow path;
a fine particulate medium in at least one of said sub-chambers to filter said effluent;
a coarse particular medium in another sub-chamber and upstream in the effluent flow from said one sub-chamber;
first means for horizontally backwashing at least said coarse medium;
second means for vertically backwashing and expanding said fine medium in said one sub-chamber; and wherein
said first means for backwashing comprises backwash water conduit means disposed within said tank between said coarse and fine media for introducing water to said tank and having outlets formed therein for flushing said coarse media.

* * * * *